United States Patent
Brandenburger

(12) 
(10) Patent No.: US 6,679,966 B1
(45) Date of Patent: Jan. 20, 2004

(54) LINER WITH A TUBULAR FILM THAT IS COATED WITH A NONWOVEN

(75) Inventor: Joachim Brandenburger, Leitenfelderstrasse-15, D-82467 Garmisch-Partenkirchen (DE)

(73) Assignees: Joachim Brandenburger, Garmisch-Partenkirchen (DE); Leo Wilhelm Betz, Bad Bergzabern (DE); Ludwig Allmann, Silz (DE)

( * ) Notice: Subject to any disclaimer, the term of this patent is extended or adjusted under 35 U.S.C. 154(b) by 0 days.

(21) Appl. No.: 09/979,772
(22) PCT Filed: May 5, 2000
(86) PCT No.: PCT/EP00/04056
§ 371 (c)(1), (2), (4) Date: Nov. 26, 2001
(87) PCT Pub. No.: WO00/73692
PCT Pub. Date: Dec. 7, 2000

(30) Foreign Application Priority Data

May 27, 1999 (DE) .......................... 199 24 251

(51) Int. Cl.⁷ .................. F16L 55/165; B32B 31/00
(52) U.S. Cl. .................. 156/190; 156/195; 156/287; 156/294
(58) Field of Search .................. 156/188, 190, 156/195, 217, 294, 287; 428/34.5, 34.6, 35.4, 36.2; 138/153, 174, 128

(56) References Cited

U.S. PATENT DOCUMENTS 5,186,987 A * 2/1993 Imoto et al. ................ 156/287
5,798,013 A * 8/1998 Brandenburger ............ 156/195

FOREIGN PATENT DOCUMENTS

| EP | 0 100 029 | | 2/1984 |
| EP | 0 101 340 | | 2/1984 |
| GB | 2113608 A | * | 8/1983 |
| JP | 10-151674 A | * | 6/1998 |
| WO | WO91/18234 | | 11/1991 |

* cited by examiner

Primary Examiner—Jeff H. Aftergut
(74) Attorney, Agent, or Firm—Collard & Roe, P.C.

(57) ABSTRACT

The invention relates to a liner for producing a lining tube for carrying out sewer pipe renovation work, comprising at least one layer consisting of at least one tubular, resin-impregnated fiber band and a tubular film located on said at least one fiber band. The aim of the invention is to improve a liner of this type. To the end, a plastic film used for producing the tubular film has a reinforcement in the form of a nonwoven layer on the side facing towards the resin-impregnated fiber bands.

1 Claim, 1 Drawing Sheet

LINER WITH A TUBULAR FILM THAT IS COATED WITH A NONWOVEN

CROSS REFERENCE TO RELATED APPLICATIONS

Figure 1:
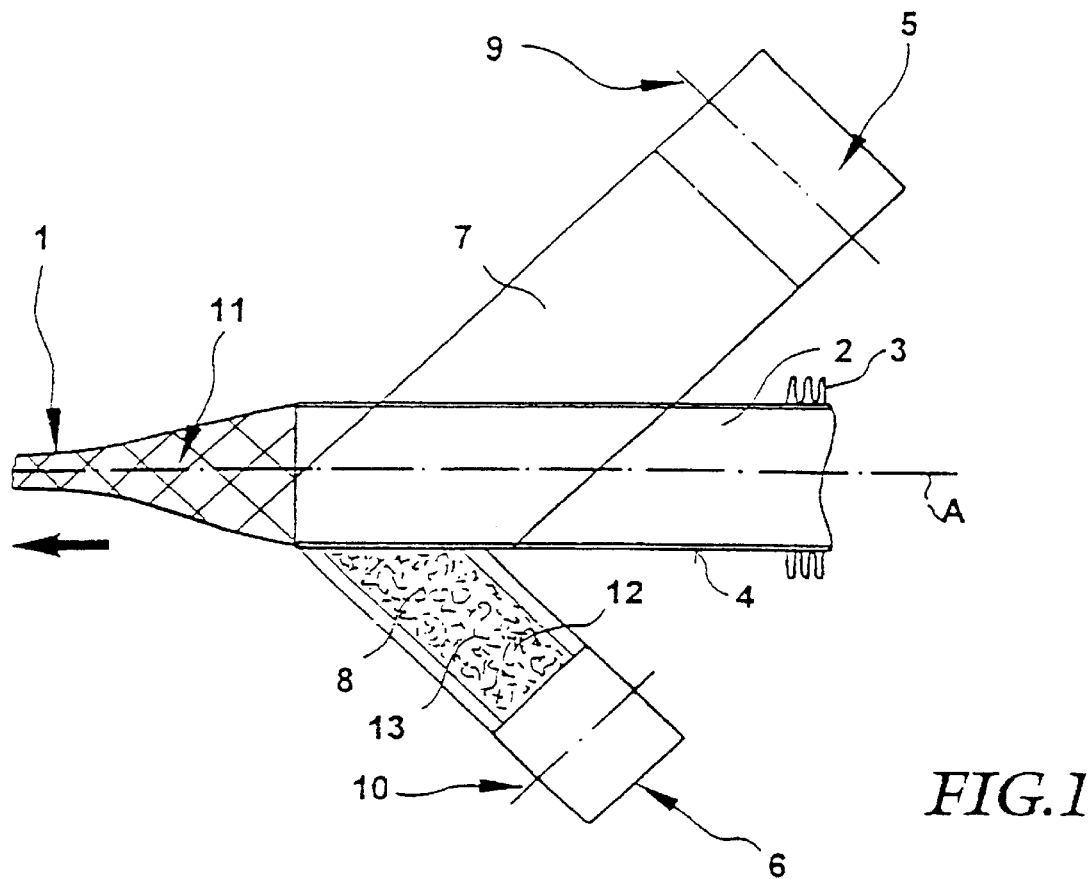

Applicant claims priority under 35 U.S.C. §119 of German Application No. 199 24 251.8 filed May 27, 1999. Applicant also claims priority under 35 U.S.C. §120 of PCT/EP00/04056 filed May 5, 2000. The international application under PCT article 21(2) was not published in English.

The invention relates to a lining tube for producing a tubular liner for sewer pipe renovation work. The lining tube is comprised of at least one layer consisting of at least one resin-impregnated fiber band arranged in the form of a tube, and a tubular film located on the at least one fiber band.

Such a lining tube (liner) as well as a method for producing such a tubular liner are known from DE 4326503 C2, where an inner tubular film consisting of a band of foil material is wound on a winding mandrel, which in turn is then wound with resin-impregnated fiber bands. The number of fiber bands then determines the strength and the thickness of the later tubular liner and can be adapted in a suitable manner to the given case of application.

It is possible also to use a pre-extruded inner tube onto which the fiber bands can then be wound. Furthermore, an outer tubular film is applied to the outer side of the fiber bands. Such an outer tubular film is expected to assure superior handling of the tubular liner, on the one hand, and to protect the not yet cured resin against saponification as it is being pulled into a sewer pipe requiring renovation, on the other hand. This requires that the lining tube is adequately bonded to the resin-impregnated fiber material because as the tubular liner is being pulled into the sewer pipe, it is subjected to numerous stresses, for example stress caused by protruding edges, pieces of roots etc. A tubular liner pulled into a defective sewer pipe is caused to rest against the wall of the sewer pipe by means of pressure medium and the resin-impregnated fiber material is subsequently cured. Curing is carried out by means of different media depending on the type of resin employed. UV-curing is preferably employed at the present time.

Another problem consists in that because of fractured sites in the wall of the sewer pipe, or in the area of, for example house connections, the walls of the sewer pipe offer no adequate support when the lining tube is set up by means of a pressure medium. The walls of the lining tube therefore have to be adequately stable so that no excessive outward bulging and damages may occur in such cracked sites. For this reason, the fiber bands always have been wound until now with an adequate thickness in order to obtain adequate stability.

Now, the invention is based on the problem of providing a tubular liner of the type specified above with enhanced strength properties.

Said problem is solved according to the invention in that a plastic film employed for forming the tubular film has a reinforcement in the form of a layer of fleece laminated to the tubular film on the side facing the resin-impregnated fiber bands.

Owing to the fact that the layer of fleece is partly melted into the surface of the plastic foil due to the laminating process, it exhibits a similar expansion behavior. This provides a tubular film so wound with additional stability which, in the course of expansion of the tubular liner in the sewer pipe section represents an additional abutment that helps bridging cracked sites or house connection sections. It is possible in this manner to produce a much more uniform liner because when the tubular liner is set up, it will expand much more uniformly over the entire circumference. Furthermore the composite material comprised of the plastic film and the layer of fleece also offer the benefit that the bond into which the plastic foil enters with the resin, which is not a good bond per se, results in superior tie-up with the fiber band material. The resin penetrates the layer of fleece and thus enters into a very intimate and solid bond which makes it that much harder for the foil to be displaced especially as it is being pulled into the sewer pipe. This assures that the resin-impregnated fiber band material is always adequately covered by the outer plastic film and cannot come into contact with any residual water left in the sewer pipe sections. Moreover, the laminate is compressed in a superior manner, which results in a superior quality with respect to mechanical characteristics and in a uniform wall thickness of the cured tubular liner.

It has been found in tests that the layer of fleece may be preferably produced from a polyester material. Very fine and thin fleeces that are accessible to a laminating process can be produced from such a material.

Furthermore, it is possible also that the reinforced tubular film is surrounded by a outer tubular film consisting of at least one plastic foil. Such an embodiment permits allocating defined properties to the tubular film materials used. The plastic foil employed for producing the reinforced tubular film may then have corresponding strength properties, whereas the plastic film used for making the outer tubular film may have advantageous properties such as, for example opaqueness, impermeability to resin etc. as well. The outer tubular film can be produced in a wound manner or by one or several plastic films that are joined lengthwise along their edges. Of course, said properties can be assumed also only by the plastic film of the reinforced tubular film. The use of an additional tubular film, furthermore, offers the added advantage that the reinforced tubular film is not required to meet excessively high requirements with respect to tightness. In particular, films can be used that are laminated to a layer of fleece over their entire surface area.

It is possible to use a polyethylene sheet as the plastic film that offers both the properties required for the lamination process and the desired processing advantages. Such a material is advantageous also for the outer tubular film.

The fleece layer may be very thin, as a rule, in order to obtain the desired properties, so that the film so treated, furthermore, can be handled and wound onto the fiber tube with relative ease. It is favorable if the layer of fleece has a thickness of 10 to 250 $\mu$m, preferably of 60 $\mu$m.

According to the embodiment is it possible in this connection that the weight of the fleece layer amounts to 10 to 300 gram per square meter, preferably 30 grams per square meter. This clearly shows, furthermore, that the layer of fleece is relatively light in weight but nonetheless entirely adequate for satisfying the desired positive purposes.

It is possible also that the plastic film comprises a layer equipped as a diffusion barrier located on the side facing away from the resin-impregnated fiber bands. It is advantageous for safety and environmental reasons if the active resin ingredient is prevented from seeping into the soil in any case. A few favorably priced plastic foils do not represent any adequate diffusion barrier for the active resin ingredients, so that an additional layer is required.

Provision can be made for said purpose that the plastic film is a composite sheet material comprising a layer preferably consisting of polyamide (PA) serving as the diffusion barrier. Such composite foils can be produced in a very simple manner, for example by co-extrusion. The co-extrusion of polyethylene and polyamide, for example, can be carried out very easily in technical terms. No adhesion problems arise in connection with the adhesion of the PA-layer to the polyethylene sheet material.

Furthermore, the edge areas of the plastic film may not be laminated with a layer of fleece, whereby such edge areas are fused together with at least one plastic film for forming the tubular film.

As the foil laminated with a layer of fleece is being welded together, it is possible only with great difficulty that the marginal zones remain non-laminated. A permanent bond can then be produced by placing the non-laminated marginal areas one on top of the other and by subsequently welding them together. Even though it is conceivable that a tube produced in such a manner may be produced from one single web of sheet material by welding the marginal areas together, it is preferred that at least two bands of film material extending parallel with each other are correspondingly joined in their marginal areas.

The fiber bands may be advantageously impregnated with a UP-resin (unsaturated polyester) or VE-resin (vinyl ester). Said resins have been found to be highly successful in the field of application of the liners and provide for a good bond with the layer of fleece of the tubular film.

Furthermore, the invention concerns a tubular liner produced by curing from a lining tube. The tubular liner comprises a cured, shaped tubular layer of substance with embedded glass fibers and a plastic film solidly bonded to the surface of the layer of shaped substance. The side of the plastic film facing the layer of molded substance is provided with a reinforcement in the form of a layer of fleece laminated to the layer of molded substance. While the outer film with the layer of fleece is forming an abutment in the production of the tubular liner and offers advantages in this connection, the finished tubular liner has the advantage that a firm bond of the outer film to the fiber bands is assured.

The invention, furthermore, relates to a method for producing a tubular liner for sewer pipe renovation work. Resin-impregnated fiber bands are shaped for this purpose into a tubular body that is then surrounded by an outer tubular film. The resin-impregnated fiber bands are usually applied by means of a winding technique. In such a winding process, at least one resin-impregnated fiber band is wound around an inner tubular film mounted on a winding mandrel, and the outer surface is subsequently provided with an outer tubular film, which may be wound as well. In connection with the method as defined by the invention, a plastic sheet for producing the outer tubular film, which is provided with a layer of fleece laminated to it at least on the side later facing the resin-impregnated fiber bands, is wound onto the body of the tube. An application of a plastic film provided with a layer of fleece laminated to it has never been carried out until now in connection with tubular liners.

In another embodiment, a method for producing a tubular liner from a lining tube is provided in which the fleece laminated to the plastic film enters into a solid bond with the body of the tube as the latter is being cured to form a tubular body. After the primary strength of the lining tube has been produced by the cured fiber bands, and the supporting effect of the outer tubular film plays an only secondary role, what matters is then is an adequately solid bond between the plastic film and the fiber material in the final condition. The fleece has a positive effect in that regard for this purpose.

Figure 2:
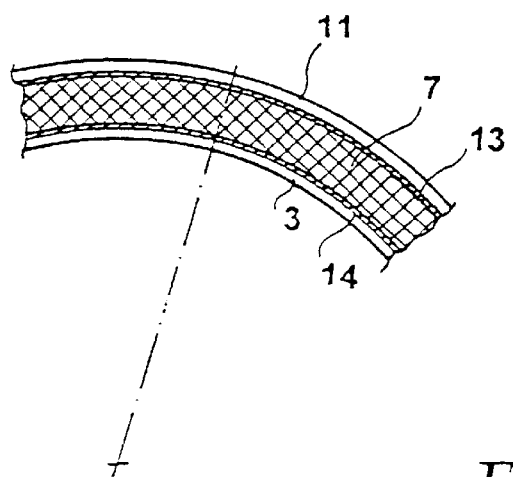

Exemplified embodiments of the present invention are partly explained in greater detail in the following with the help of a drawing, in which:

FIG. 1 is a schematic representation of a production process for producing a tubular liner; and FIG. 2 is a cutout of a cross section of a tubular liner coated with a plastic film.

In the manufacture of a tubular liner 1, a device is employed of the type as described, for example in DE 4326503 C2. This device comprises a stationary winding mandrel 2, onto which an inner tubular film 3 is strung. Inner tubular film 3 consists of polyethylene and has been produced in an extrusion manufacturing process for producing tubular plastic film material.

The outer surface 4 of the inner tubular film 3 may be subjected, for example to a corona treatment method, by which the surface tension of the outer surface 4 is distinctly raised beyond a minimum limit value of 38 mN/m. However, it is possible also to provide the outer surface 4 of the inner tubular film 3 with a layer of fleece applied to it in a laminating process.

The supply rolls 5 and 6 are located within the area of the winding mandrel 2. The band materials 7 and 8, respectively, are wound on the winding mandrel 2. The angular position of the axles 9 and 10 of the supply rolls 5 and 6, which are shown only schematically, can be adjusted on a winding device not shown, which is rotating about the axis A of the winding mandrel. In this way, the strip-shaped materials 7 and 8 are wound around the inner tubular film 3 in a helical manner. The strip-shaped material 7 is a resin-impregnated glass fiber fabric. A UP-resin is employed in the present case. The resin can be applied already prior to or in the course of the winding process. It is possible also to wind several fiber bands onto the inner tubular film 3. The band material 8 is a plastic film made of polyethylene, which is finally wound onto the resin-impregnated glass fiber fabric, so that a tubular film 11 forms a protective outer layer.

The tubular liner 1 so produced is flattened and pulled off and stored as supply material, or directly pulled into a sewer pipe to be restored.

The inner surface 12 of the plastic film 8 is laminated with a reinforcement in the form of a fleece layer 13. The laminating process is preferably carried out by partially melting the plastic film 8, so that the polyester fleece is partly embedded in the surface 12 of the plastic film 8. The fleece has a thickness of 60 $\mu$m and a weight of 30 grams per square meter. The fleece layer 13 is thoroughly impregnated with the resin, so that an intimate bond is produced between the fiber bands 7 and the plastic film 8 even in the uncured condition. It is possible also to use other fleece materials such as, for example glass fleece.

When the tubular liner 1 is subsequently pulled into a sewer pipe section to be restored, the inner tubular film 3 and the tubular film 11 are substantially retained in an undisplaceable manner on the surfaces of the resin-impregnated glass fiber fabric. This makes it more difficult for sites of leakage to develop that could result in saponification of the resin.

Furthermore, the advantage offered by a plastic film laminated with a layer of fleece consists in that the plastic film and the layer of fleece will not lose their tendency to bond to each other even in the course of longer storage, as it could be the case, for example with films whose surfaces have been activated by a corona treatment.

The tubular film 11 provided with the fleece 13, however, also serves the purpose of setting up the tubular liner 1 in the sewer pipe section as an outer abutment, so that a more uniform set-up takes place because of the positive force ensuing from such as reinforcement. Especially in the area of breakouts and washouts, where the tubular liner 1 is not directly resting against the walls of the sewer pipe, the aim is to obtain defined mechanical characteristics, so that the tubular liner 1 will be prevented from bulging outwards in such sites, causing such areas to become thinner. The reinforcement substitutes for the outer support in such sites as the liner is being set up for installation. After the lining tube 1 has then be cured to form a tubular liner, the mechanical characteristics are made available by the cured fiber bands.

Furthermore, it is possible also to employ as the plastic film 3 or 8 a composite foil comprising a diffusion barrier.

FIG. 2 shows by a cross sectional view the structure of a tubular liner produced with the lining tube. The fleece layer 13 provides for an intimate bond of the tubular film 11 with the cured glass fiber fabric 7. In the present case, the inner tubular film 3 is provided with a fleece layer 14 on its outer surface 4 as well.

In another embodiment of the invention not shown, the tubular film 11 is surrounded by an outer tubular film as well. Said outer tubular film can then assume all additional functions such as the function of a diffusion barrier, the function of opaqueness, reflection etc. In this case, the plastic film for the reinforced tubular film may then only have the properties that are favorable for it per se and needs not to be, for example a composite film for producing a diffusion barrier. Also, the fleece layer 13 can be applied to the plastic film over its entire width because the edges do not necessarily have to be fused, i.e. such a tubular film must not necessarily be tight because provision is additionally made for an outer tubular film assuming said function of tightness. The outer tubular film can be produced from one or more plastic films. Such plastic films may be wound or assembled in the longitudinal direction and joined with each other, for example fused with one another.

What is claimed is:

1. A method for producing a tubular liner for sewer pipe restoration work, including a tubular body made from at least one resin impregnated fiber band, and surrounded by an outer film layer including a plastic film and a reinforcing fleece, which method comprises the steps of:

(a) shaping at least one resin impregnated fiber band into a tubular body (7);

(b) laminating a fleece layer (13) having a thickness of 10 to 250 µm to at least one side of a plastic film (8) to form a laminate (11);

(c) subsequently winding said laminate (11) onto said tubular body (7) so that said fleece layer (13) faces said at least one resin impregnated fiber band; and (d) subjecting said tubular body to a curing process to form a tubular liner solidly bonded with said fleece laminated to said plastic film.

* * * * *